United States Patent Office

3,194,787
Patented July 13, 1965

3,194,787
PROCESS FOR THE PRODUCTION OF
PHOSPHONITRILIC POLYMERS
Cyril Aubrey Redfarn, London, Martin Apley, Altrincham, and James Ranald Alexander, Bolton, England, assignors to The Walker Chemical Company Limited, Bolton, England, a British company
No Drawing. Filed Jan. 23, 1961, Ser. No. 83,914
Claims priority, application Great Britain, Jan. 28, 1960, 3,165/60
7 Claims. (Cl. 260—47)

This invention is for improvements in or relating to the production of polymeric substances and has for an object to provide polymeric substances containing a high proportion of phosphorus and nitrogen which have improved heat-resistance as compared with conventional phenolic resins and which are useful as bonding agents for adhesives for various purposes, as moulding materials and for surface-coating and impregnating compositions as well as for the production of fire-proofing compositions.

It is known that the reaction of ammonium chloride with phosphorus pentachloride gives rise to mixtures of compounds which were called polyphosphochloronitrides but which are now referred to as polyphosphonitrilic chlorides. It is possible to obtain from these mixtures, triphosphonitrilic chloride $(PNCl_2)_3$ which is a cyclic crystalline substance, M.P. 114° C., and tetraphosphonitrilic chloride $(PNCl_2)_4$ which is also a cyclic crystalline substance, M.P. 123.5° C., and also linear oily polyphosphonitrilic chlorides $(PNCl_2)_n$ where $n$ has a value which exceeds 4. By heating the various aforesaid polyphosphonitrilic chlorides or mixtures thereof, it is possible to obtain elastomers, of the formula $(PNCl_2)_n$ wherein the value of $n$ is about 300, or infusible solids. Such elastomers are of little industrial value.

It is known that, when the polyphosphonitrilic chlorides obtained by the reaction of ammonium chloride and phosphorus pentachloride are reacted with alcohols, the chlorine groups can be replaced in part by alkoxy groups and in part by hydroxyl groups.

The alcohols which may be used for reaction with the polyphosphonitrilic chlorides may be any organic monohydroxy compounds including the aliphatic mono-hydoxy alcohols and also including the aralkyl alcohols, such as benzyl alcohol.

The reaction between the polyphosphonitrilic chloride and the organic hydroxy compounds may be carried out in such a way that the proportion of chlorine remaining attached to the skeleton of the original polyphosphonitrilic chloride is so low as to be substantially negligible.

We have found that the compounds produced in this way, which are hereinafter referred to as polymeric alkoxylated phosphonitrilic compounds, may be reacted with polyhydroxy aromatic compounds in a similar manner to that described in our prior British Patent No. 812,126 in relation to the reactions of the polyphosphonitrilic chlorides themselves.

According to the present invention, there is provided a process for the production of polymeric substances which comprises heating a polymeric alkoxylated phosphonitrilic compound under substantially anhydrous conditions, with a polyhydroxy aromatic compound, either in the presence or absence of an inert solvent; if desired, mono-hydroxy aromatic compound may be used in place of a part of the polyhydroxy aromatic compound and, in such an instance, the mono-hydroxy aromatic compound leads to an internal plasticisation of the final product.

The products produced in accordance with the present invention are capable of being converted to a fully cured product by the action of heat; in some instances, depending upon the proportion of polyhydroxy aromatic compound used with respect to the polymeric alkoxylated phosphonitrilic compound, an adequate thermo-setting reaction may require the addition of a methylene donor, such as formaldehyde or a polymer thereof or hexamethylene tetramine.

The polyhydroxy aromatic compounds employed in carrying out the above process may be a partial ester with boric acid, with an inorganic phosphoric acid or a polyfunctional chloride derivative thereof, or with phosphorus trichloride, of a polyhydroxy aromatic compound which partial ester molecule contains free phenolic hydroxy groups. The preparation of such partial esters is described in our prior British Patent No. 807,851.

Various other modifications of the reaction above described may be adapted in the same way as said modifications are described in our prior British Patent No. 812,126.

The use of the polymeric alkoxlated phosphonitrilic compounds in the process of the present invention leads to the advantages, as compared with certain of the products of the above-mentioned prior British Patent No. 812,126, that there is an absence of fuming on storage or on reaction and also that there is less likelihood of corrosion of metallic containers in which the products of the invention may be stored owing to the substantial absence of chlorine on the phosphonitrilic chain, whilst furthermore the uncured products of the present invention are less hygroscopic than the products of the said prior British patent and the fully cured products of the present invention appear to be substantially non-hygroscopic.

The following description of the preparation of a number of polymeric alkoxylated phosphonitrilic chlorides is given to facilitate the carrying out of the present invention illustrated in the subsequent examples.

PREPARATION 1

108 parts of the polyphosphonitrilic chlorides obtained by the reaction of ammonium chloride and phosphorus pentachloride (under such conditions that the product is of such molecular weight that it is soluble in tetrachlorethane) are refluxed for 3 hours with 62 parts of methanol. A white, solid, methoxylated polyphosphonitrilic compound is precipitated, filtered and dried.

PREPARATION 2

108 parts of the polyphosphonitrilic chlorides described in the foregoing preparation are dissolved in 108 parts of tetrachlorethane by warming to 50° C. 62 parts of methanol are added and the mixture is refluxed for 3 hours. A further 31 parts of methanol are then added and the mixture is then refluxed for a further 2 hours whereafter the solvent is removed under vacuum leaving a white, solid, methoxylated polyphosphonitrilic compound which is dried at 80–90° C.

The solvent used in the above method may be replaced by benzene, tetrahydrofurane, trichlorethylene or other inert solvent.

PREPARATION 3

50 parts of the polyphosphonitrilic chlorides described in Preparation 1 are dissolved in 50 parts of methyl ethyl ketone by warming to 40° C. 129 parts of a 36% solution of sodium methoxide in methanol is slowly added, and the mixture refluxed for 1½ hours at atmospheric pressure. Volatile matter is then removed under reduced pressure and sodium chloride is removed by treating the mixture with 50 parts of cold water and filtering. The residue of methoxylated polyphosphonitrilic compound is washed with ether and is dried giving a brown oily paste.

PREPARATION 4

This preparation is carried out following the procedure of Preparation 2, but replacing the methanol by an equivalent quantity of ethanol. The ethoxylated polyphosphonitrilic compound obtained is a white powder insoluble in water and in alcohol, benzene and tetrachlorethane.

PREPARATION 5

This preparation is carried out following the procedure of Preparation 2, but replacing the methanol by an equivalent quantity of normal butanol. The butoxylated polyphosphonitrilic compound obtained is a brown solid which is soluble in water.

PREPARATION 6

108 parts of the crystalline trimer of phosphonitrilic chloride are dissolved in 108 parts of trichlorethylene by warming to 50° C. Methanol is added as described in preparation 2 and the subsequent operations are followed as in that preparation. The methoxylated polyphosphonitrilic compound obtained is a white, deliquescent solid, soluble in water.

The following examples will serve to illustrate the manner in which the present invention may be carried into effect, the parts and percentage figures quoted therein being calculated by weight.

Example 1

90 parts of hydroquinone (technical grade) are dissolved at 150° C. in 90 parts of amyl acetate. To this solution, 70 parts of the methoxylated polyphosphonitrilic compound described in Preparation 2 are added. The mixture is refluxed for 5½ hours. During this period, the methoxylated compound dissolves and a pale amber-coloured syrup separates out at the bottom of the reaction vessel. The mixture is cooled to 100° C., the solvent is decanted and a further 90 parts of amyl acetate are added. The mixture is refluxed for 1 hour, cooled as before and the solvent again decanted. The residual resin syrup is then freed from solvent by vacuum drying at a temperature up to 150° C. under 50 mm. pressure.

The pale amber-coloured resin obtained is soluble in water and is dispersible in methanol. It may be hardened when mixed with 10% of hexamethylenetetramine to a dark brown infusible solid after heating at 200° C. for 10 minutes on a hotplate. Without curing agent, the resin remains soft and sticky when heated for over 15 minutes at 200° C. on a hot plate.

Example 2

110 parts of resorcinol (technical grade) were dissolved in 600 parts of tetrachlorethane by heating to 140° C. To the clear solution thus obtained, 220 parts of the methoxylated polyphosphonitrilic compound described in Preparation 2 were added over a period of 30 minutes. The mixture was refluxed at 145° C. for 1 hour after which the solvent was decanted from the red-brown layer of resin which formed at the bottom of the reaction vessel. The resin was freed from solvent by vacuum distillation at temperature up to 120° C.

This red brittle solid resin can be thermoset to a red rubbery solid when heated with 10% of hexamethylenetetramine at 200° C. for 2 minutes on a hotplate.

Example 3

85 parts of the product obtained from the reaction of methanol with triphosphonitrilic chloride as described in Preparation 6, were heated with 110 parts of hydroquinone at 190° C. for 5 hours. The product, on cooling, was a hard, opaque, brown solid resin only sparingly soluble in water, but soluble in methanol. This resin when heated with 10% of hexamethylenetetramine can be cured to a rubbery solid on heating at 200° C. for 6 minutes on a hotplate.

Example 4

55 parts of catechol were heated to 140° C. and 54 parts of the methoxylated polyphosphonitrilic compound described in Preparation 2 were added. The mixture was heated at 200° C. for 4 hours. The product obtained was an amber-coloured, hard solid resin soluble in water. It can be cured when heated with 10% of hexamethylenetramine at 200° C. in 3 minutes on a hotplate to a black infusible solid.

Example 5

110 parts of resorcinol were heated to 140° C. and 107 parts of the methoxylated polyphosphonitrilic compound described in Preparation 2 were added. The temperature of the mixture was raised to 160° C. and this temperature was maintained for 3 hours. On cooling, the product obtained was a red solid resin, soluble in water. With an addition of 5% of hexamethylenetetramine, the resin can be cured to a black infusible solid in 8 minutes on a hotplate at 150° C.

Example 6

165 parts of hydroquinone and 94 parts of phenol were dissolved in 500 parts of tetrachlorethane at 150° C. and 232 parts of the methoxylated polyphosphonitrilic compound described in Preparation 2 were added. The mixture was heated at 150° C. for 3 hours. The solvent was then decanted and the residual resinous mass was dried at temperatures up to 120° C. under reduced pressure.

The product was a dark solid resin soluble in water. With an addition of 10% of hexamethylenetetramine, it can be cured on a hotplate at 200° C. in 11 minutes.

Example 7

32 parts of hydroquinone were dissolved in 32 parts of amyl acetate at 150° C. 25 parts of the butoxylated polyphosphonitrilic compound as described in Preparation 5 were added and the mixture was refluxed for 3 hours. The solvent was decanted and the residual product was a hard, brittle, amber-coloured resin, soluble in water. The resin could be cured on a hotplate at 200° C. in 3 minutes to a black rubbery solid. With an addition of 10% of hexamethylene tetramine, the resin could be cured on a hotplate at 200° C. in 2 minutes.

Example 8

A resin was prepared as in Example 1 and was dissolved in water to form a 40% solution. 10% of hexamethylenetetramine, based on the solid resin, was dissolved in the resin solution. Asbestos fibre, in the form of a felt was impregnated with the resin solution thus prepared and was dried in a circulating air oven at 80° C. for 8 hours. The dry resin content of the impregnated sheet was found to be 35%. The sheet was then cut into 8" x 1" strips. Six dried impregnated strips were laid up to form a pack approximately 1½" deep and the pack was placed in a hot press at a pressure of 700 pounds per square inch with platen temperatures of 280° C. for 30 minutes. The resulting laminate was ⅛" thick.

The cross-break strength of the laminate was found to be 23,100 pounds per square inch. After exposure for 50 hours to a temperature of 500° C. in an electric furnace, the cross-break strength was 10,300 pounds per square inch.

Example 9

A length of fine weave of glass cloth (high alkali grade) was impregnated with the resin-hexamethylenetetramine solution prepared as described in Example 8, and dried at 80° C. for 7 hours. The resin content of the impregnated dried cloth was 42%. The cloth was cut into strips (8" x 1") and the strips laid-up into a pack which gave a laminate ⅛" thick after pressing at 300° C. at a pressure of 600 pounds per square inch for 30 minutes. The cross-break strength of the glass laminate obtained was 25,400 pounds per square inch.

In all the foregoing examples there was an absence of acid fumes during the reaction or curing and the uncured resins were substantially non-corrosive towards metals. These properties are believed to be due to the substantially complete absence of residual chlorine in the cured or uncured resins. It would be theoretically possible to remove residual chloride from the cured and uncured products of our prior British Patent No. 812,126 by reacting them with an alcohol but we have found that such a treatment does not wholly overcome the fuming or the corrosiveness of the prior products. This result may be possibly due to the greater molecular complexity of the resins, as compared to that of the initial polyphosphonitrilic chlorides, giving rise to steric hindrance and thus preventing complete alkoxylation.

For each of the Examples 1 to 7, there may be substituted for the polyhydroxybenzenes used therein a partial ester containing free phenolic hydroxy groups, as referred to herein and as more particularly described in our above-mentioned British Patent No. 807,851; such a substitution of polyhydroxy aromatic compounds does not involve any significant change in the procedure set out in said examples and the products resulting from the use of said partial esters as the polyhydroxy aromatic compounds are closely similar to the products described in the said examples.

We claim:

1. A process for the production of polymeric substances which comprises heating a polymeric chlorine-free alkoxylated phosphonitrilic compound under substantially anhydrous conditions, with an amount of a polyhydroxy aromatic hydrocarbon sufficient to produce a polymerizable product.

2. A process according to claim 1 wherein the reaction is carried out in solution in an inert liquid organic solvent.

3. A process according to claim 1 wherein a monohydroxy aromatic hydrocarbon is incorporated in the reaction mixture.

4. A process according to claim 1, wherein said polyhydroxy aromatic hydrocarbon is a partial ester of boric acid with a polyhydroxy aromatic hydrocarbon which partial ester contains free phenolic hydroxy groups.

5. A process according to claim 1, wherein said polyhydroxy aromatic hydrocarbon is a partial phosphorus ester of a polyhydroxy aromatic hydrocarbon and of a member selected from the group consisting of an inorganic phosphoric acid, a polyfunctional chlorine derivative of an inorganic phosphoric acid and phosphorus trichloride, which partial ester contains free phenolic hydroxy groups.

6. A process according to claim 1, wherein the polyhydroxy aromatic hydrocarbon is a polyhydroxybenzene having a free position in the nucleus which is reactive to formaldehyde.

7. A process for the production of thermo-set resins which comprises heating the product of the process of claim 1 with a methylene donor selected from the group consisting of formaldehyde, a polymer of formaldehyde, and hexamethylenetetramine.

References Cited by the Examiner

UNITED STATES PATENTS 2,586,312  2/52  Dishon et al. _____ 260—2
2,866,773  12/58  Redfarn _____ 260—57

FOREIGN PATENTS 812,126  4/59  Great Britain.

WILLIAM H. SHORT, *Primary Examiner.*

HAROLD N. BURSTEIN, JOSEPH L. SCHOFER, *Examiners.*